UNITED STATES PATENT OFFICE.

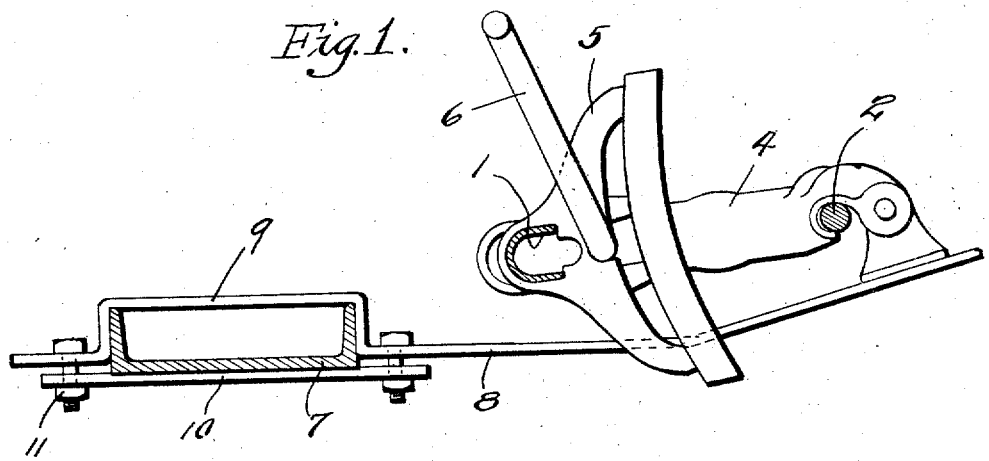
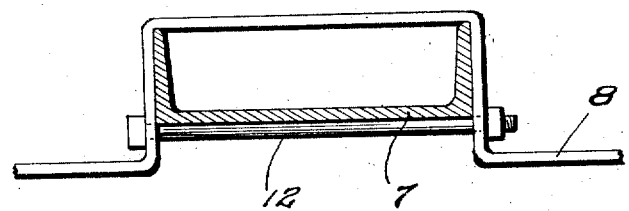
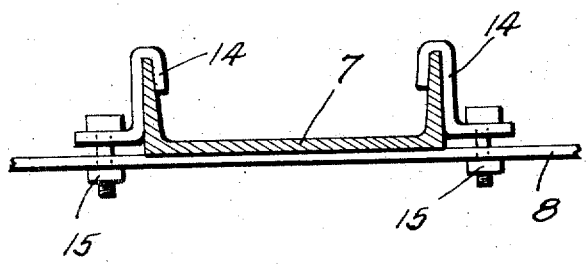
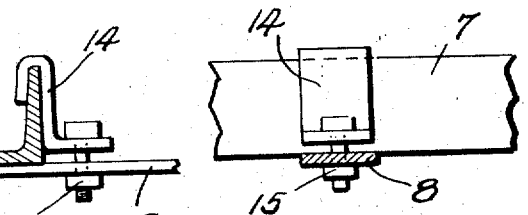

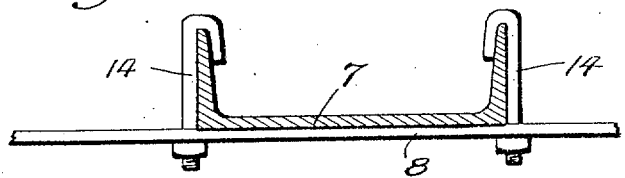
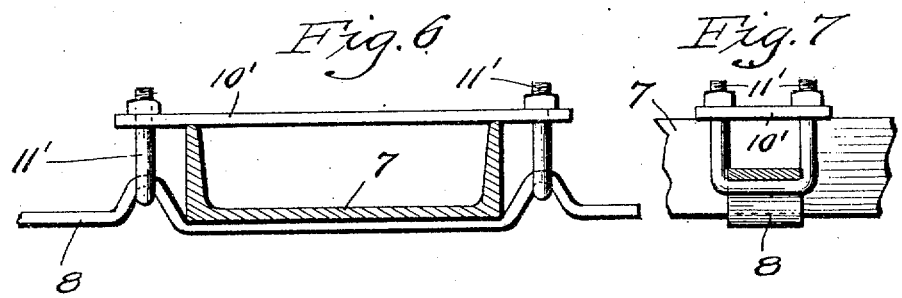
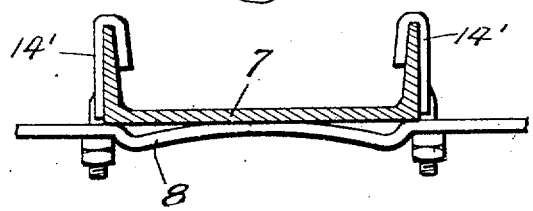
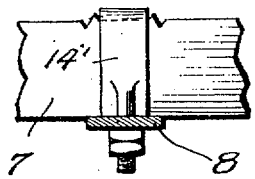
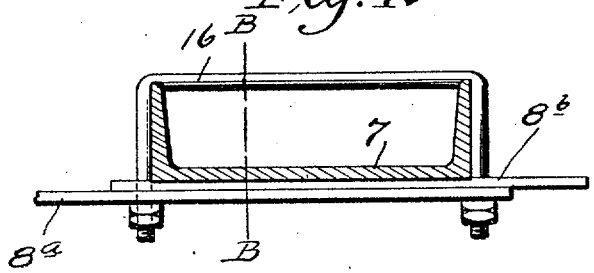
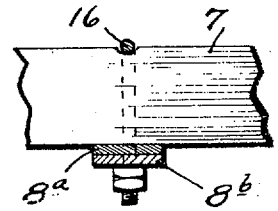

CHARLES HAINES WILLIAMS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SPRING-PLANK CONNECTION FOR BEAM-SUPPORT SPRINGS.

1,207,256.

Specification of Letters Patent.

Patented Dec. 5, 1916.

Application filed September 27, 1916. Serial No. 122,447.

*To all whom it may concern:*

Be it known that I, CHARLES HAINES WILLIAMS, a citizen of the United States, residing at the city of Chicago, county of Cook, and State of Illinois, have invented a certain new and useful Improvement in Spring-Plank Connections for Beam-Support Springs, of which the following is a full, clear, and exact description, such as will enable others skilled in the art to which it appertains to make and use the same, reference being had to the accompanying drawings, forming part of this specification.

This invention relates broadly to railway rolling stock, and specifically to an improvement in a form of connection for mounting third or fourth point brake beam supporting springs upon trucks not specially designed for the reception thereof.

The invention also relates to certain improvements in the form and construction of third and fourth point supporting springs whereby they are adapted for attachment to trucks not specially formed to receive them.

It frequently becomes desirable to attach to trucks not specially designed therefor, third or fourth point supporting springs for sustaining the brake beams in the customary fashion. In present practice, this is a difficult and expensive undertaking, as it entails the dismantling of the truck for the removal of the spring plank, in order that holes may be drilled therein for the reception of the securing means customarily employed for fastening the third or fourth point springs to the spring plank.

It is the object of my present invention to obviate the dismantling of the truck and the drilling of the spring plank, and thereby eliminate a large proportion of the expense incident to equipping with third or fourth point springs, trucks which are already in service and not so equipped.

It is the principal object of my invention, therefore, to provide a special form of supporting spring and spring plank connection, or special forms of supporting springs and suitable attaching devices therefor, by virtue of which third or fourth point supporting springs may be installed in trucks already in service without necessitating the dismantling of the trucks or their removal from service for any material length of time.

Other objects of the invention will be obvious or pointed out hereinafter.

As is well known, the third or fourth point springs are resilient members customarily supported from the spring plank and extending forwardly and rearwardly into coöperative association with the brake beams which are arranged to be slidably supported on the supporting springs.

In the accompanying drawings is illustrated an application of my invention, together with several modifications thereof.

Figure 1 is a sectional elevation of a truck portion illustrating one form of my invention and the application thereof to a truck; Fig. 2 is a detail illustrating a modified form of the invention, the same showing the spring plank in sectional elevation and the spring in side elevation; Fig. 3 is a similar detail of a second modification; Fig. 4 an end view thereof; Fig. 5 a detail of a third modification; Fig. 6 a detail of a fourth modification; Fig. 7 an end view thereof; Fig. 8 a detail of a fifth modification; Fig. 9 an end view thereof; Fig. 10 a detail of a sixth modification; Fig. 11 a section thereof on line B—B of Fig. 10.

Referring to these illustrations by the reference characters, let it be understood that 1 represents the compression member of the brake beam, 2 the tension member, 4 the strut, 5 the brake head and 6 the hanger which supports the brake beam from the truck frame. Numeral 7 indicates the spring plank which is assembled in the truck in the conventional fashion. These are all representative of similar parts universally employed in railway trucks, as will be readily understood by those skilled in the art. It frequently becomes desirable, however, that the means for supporting the brake beam be augmented by the addition of third or fourth point supports of the general type disclosed in my U. S. Letters Patent Nos. 997,888 dated July 11, 1911, and 1,114,210 dated October 20, 1914. My present invention provides means for accomplishing this without dismantling the truck or fitting the spring plank for special fastenings.

As illustrated in Fig. 1, the supporting spring 8 may be formed with an offset portion 9 adapted to pass around a portion of the spring plank. When the supporting spring is placed in position upon the spring plank, it is secured thereto by means of a clamping strip 10 and clamping bolts 11, which latter are seated in the spring and are operable effectively to draw the clamping strip 10 and the spring 8 together to clamp the spring plank 7 between them. To this purpose, the offset portion of the supporting spring is offset to an extent slightly less than the height of the spring plank, so as to give the requisite amount of clearance between the clamping strip and the spring. By virtue of this clamping action, the spring will be securely held in position upon the spring plank, and held against movement relative thereto in any direction.

In Fig. 2 is shown in detail a modification of the form just described, wherein a tension bolt 12 is used in the place of clamping strip 10 and clamping bolts 11. This bolt 12 operates to draw the vertically displaced portions of the spring 8 together to clamp the spring plank laterally.

In the modification illustrated in Fig. 3, the spring 8 has no displaced portion, but hook-shaped members 14 having their upper extremities adapted to engage over the upper portion of the spring plank, and having their lower portions retained by bolts 15 which pass through holes in the spring 8, may be used effectively to clamp the spring to the plank. In this form the hook-shaped clamping members 14 are in the form of flat straps, while in the form illustrated in Fig. 5 they are in the form of bolts having their threaded ends passing through the apertures in the spring 8.

In the form illustrated in Figs. 6 and 7, the offset portion of the spring is engaged under the spring plank instead of over it, while the clamping strap 10' and bolts 11' encompass the upper and lateral portions of the plank. In this form, moreover, the bolts 11' are of U form so that they embrace the spring, being retained in position by convolutions in the spring, so that there is no necessity for piercing the spring.

In the form illustrated in Figs. 8 and 9, the spring passes below the spring plank, but has its central portion deformed or bent upwardly out of its normal plane so that, when the clamps 14' are tightened, the middle portion of the spring will be put under compression and the clamping action upon the plank thereby increased. Fig. 9 shows an expedient for preventing lateral displacement of clamping members such as those illustrated in Figs. 8 and 3, the flanges of the spring plank being slightly displaced at the sides of the clamping members to provide projections which hold the latter against lateral movement.

In the form illustrated in Fig. 10, the spring is shown as composed of two sections $8^a$ and $8^b$, both sections being engaged by the U-shaped clamping bolt 16 which encompasses the upper portions of the spring plank.

As illustrated in Fig. 11, a slight depression may be made in the margins of the flanges of the spring plank to retain the bolt 16 against lateral displacement. It is obvious that this form of connection may be employed with an integral spring, and that the other forms of connections described may be similarly employed with sectional springs.

It will be observed that with any of the various forms of my invention above described, the springs constituting the third or fourth point supporting members for brake beams may be quickly and easily installed in trucks not specially fitted therefor, without necessitating the removal of the spring plank, or the drilling thereof for the reception of the forms of fastenings customarily employed.

The fastening devices in all forms of my invention illustrated in the accompanying drawings are arranged externally the spring plank. By this I mean that the supporting track or spring constituting the third or fourth point supporting member, forms one element of the clamp with which the other element, or elements, coöperates, two or more elements of the clamp embracing the spring plank or a part thereof, the fastening members between the clamping elements not being directly connected to the spring plank in any way by passing through holes especially designed therefor provided in said plank. Of course where the spring plank is made up of two angle bars connected together at their ends, as is a common practice, there will be an opening between the angle bars through which the fastening bolts for the clamping members may pass. Even in this instance while the fastening bolts would be located within the lines of the spring plank, they would not be connected to any of the members thereof and therefore might be said to be located externally the spring plank or its members. By this arrangement of externally arranged fastening devices, I am enabled to adjust the third or fourth point supporting spring or track lengthwise the spring plank to accommodate different types of brake beams.

I am aware that the invention as hereinafter claimed is susceptible of embodiment in various forms other than those hereinbefore specifically described.

What I claim is:

1. In a truck, the combination with a spring plank, a brake beam supporting spring or track associated therewith, devices adjustable lengthwise the spring plank for clamping said spring or clamp in operative position on the plank.

2. In a truck, the combination of a spring plank, a brake beam supporting spring or track carried thereby, and fastening devices to secure said spring or track in position on the plank, said fastening devices being arranged externally the plank.

In testimony whereof I hereunto affix my signature in the presence of two witnesses, this 22nd day of September, 1916.

CHARLES HAINES WILLIAMS.

Witnesses:
E. T. WALKER,
M. E. LYNCH.